United States Patent [19]
Talbot

[11] 3,902,268
[45] Sept. 2, 1975

[54] LINE ATTACHMENT MEANS FOR FISHING LINE FLOATS

[76] Inventor: Earl A. Talbot, P.O. Box 1003, Parksville, British Columbia, Canada

[22] Filed: July 8, 1974

[21] Appl. No.: 486,574

[52] U.S. Cl. ............................................... 43/44.92
[51] Int. Cl.² ........................................ A01K 93/00
[58] Field of Search............ 43/44.92, 44.91, 44.93, 43/44.95, 43.1, 8, 3; 16/147, 179, DIG. 17, 141, 144, 146; 292/153

[56] References Cited
UNITED STATES PATENTS
3,067,539  12/1962  Black ................................. 43/44.92

Primary Examiner—Louis G. Mancene
Assistant Examiner—Peter K. Skiff

[57] ABSTRACT

This line attachment means is applied to an edge of a large, flat, oblong float body of the type used in trolling for large fish. It comprises a longitudinally extending rod supported for oscillation by bearings on an edge of the float body. The rod has means on each end to releasably engage with a line. A movable line clamping plate is secured to a medial part of the rod to oscillate the rod and to clamp a fishing line between it and a fixed plate on the float body. The fixed plate has a catch member on it. A handle which can be operated easily by one hand is pivotally supported by the movable plate and carries a notched latch plate which is quickly and easily engaged with the catch member and is not liable to be disengaged accidentally.

2 Claims, 7 Drawing Figures

PATENTED SEP 2 1975  3,902,268
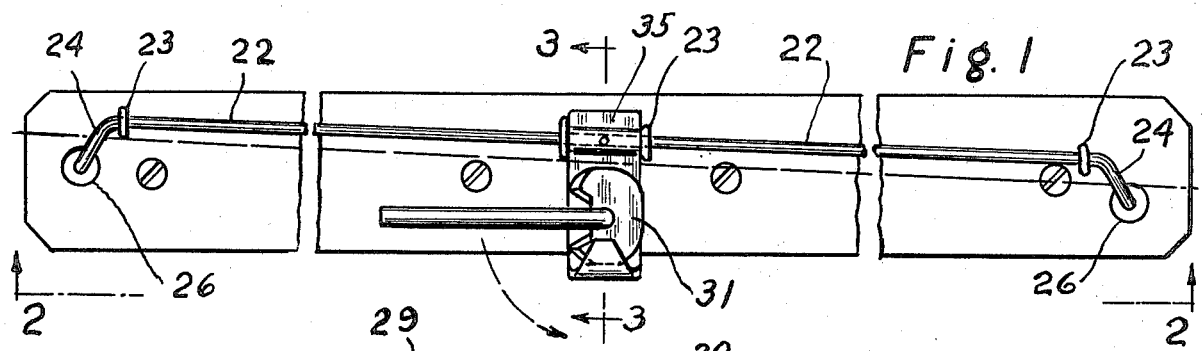
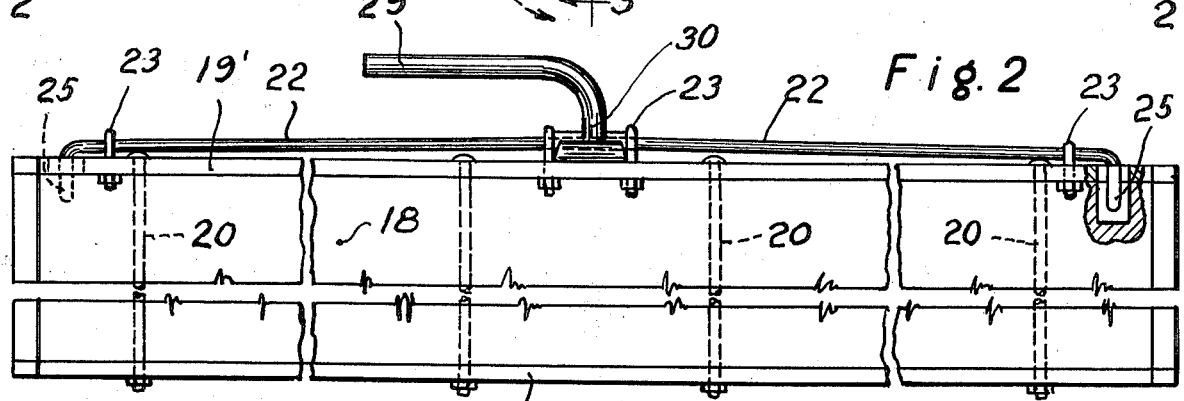
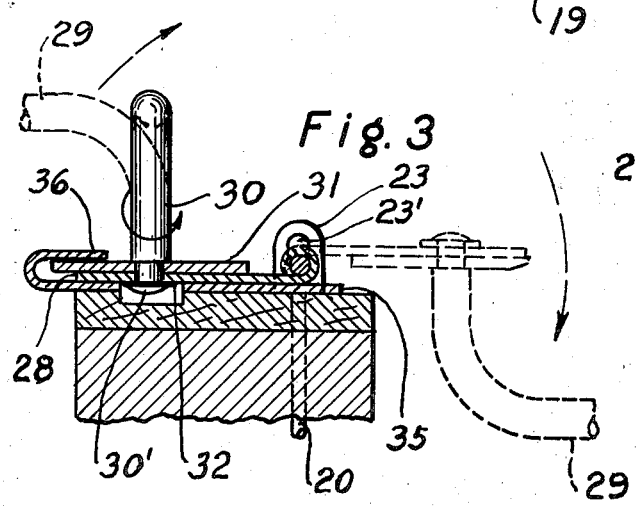
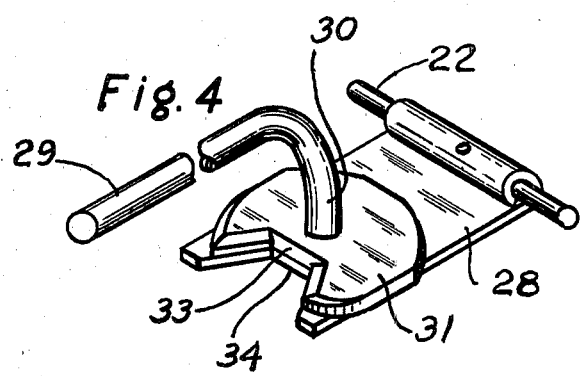
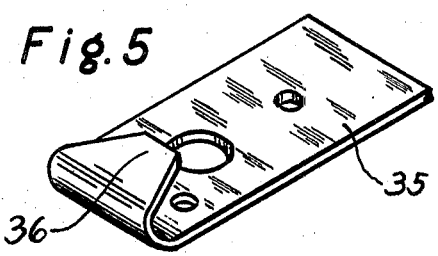
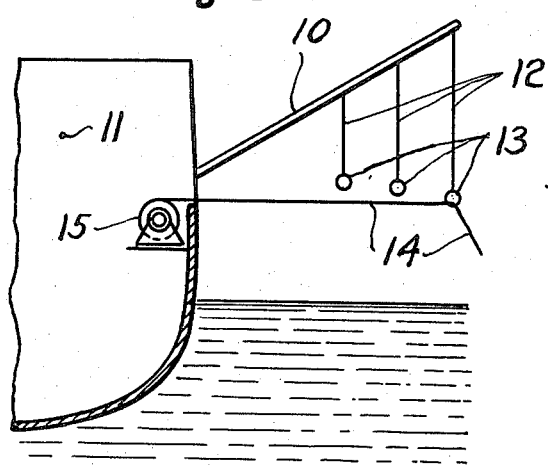
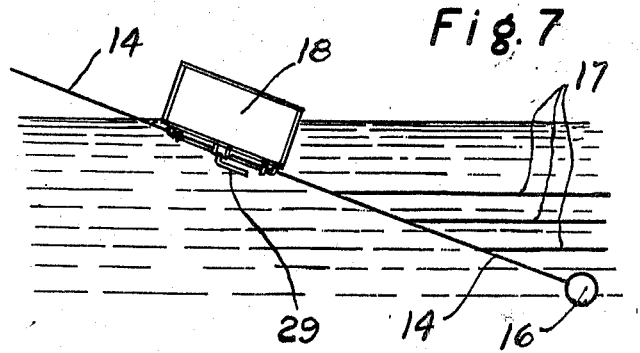

LINE ATTACHMENT MEANS FOR FISHING LINE FLOATS

DESCRIPTION OF THE PRIOR ART

Previously constructed large fishing line floats of the type adapted for use in trolling for large fish are provided with manually operated line attachment devices for releasably connecting them to a fishing line; but as far at known to applicant, all of these prior art devices require use of both hands of the user to connect them to and disconnect them from a line. This makes it difficult and time consuming to attach and detach them since the float is usually out of the water and has to be held at the time it is being attached to or detached from a line.

SUMMARY OF THE INVENTION

A primary object of my invention is to provide line attachment means for large fishing line floats, which means can be quickly and easily operated with one hand while the float is held with the other hand. Another object is to provide line attachment means for a large size float which means will clamp and hold the line firmly without slippage and which is not liable to become accidentally detached from the line.

Another object is to provide a clamp type line attachment means of strong, simple and efficient construction which can be applied to an edge of a large, flat, oblong fishing line float that normally floats edgewise in a generally vertical plane in the water with the line passing under the bottom edge of the float.

Another object is to provide line attachment means which will normally hold a large, flat, oblong float parallel with the line and which can be applied to the float in such a manner as to cause the float and any lines trailing therefrom to follow a farther outwardly, offset course relative to the course of the boat, thereby separating fishing lines farther apart and reducing the danger of line tangling when a plurality of lines are being used side by side.

Other objects will be apparent from the following description and accompanying drawings.

BRIEF DESCRIPTION OF THE DRAWINGS

FIG. 1 is an edge view, with parts broken away, of a float provided with line attachment means constructed in accordance with my invention, and showing the float attached to a line.

FIG. 2 is a view in elevation of said float, looking in the direction indicated by line 2—2 of FIG. 1, parts being broken away.

FIG. 3 is a sectional view with parts in elevation taken on line 3—3 of FIG. 1 and on a larger scale than FIG. 1.

FIG. 4 is a detached isometric view of one part of the line clamping means.

FIG. 5 is a detached isometric view of another part of said line clamping means.

FIG. 6 is a diagrammatic view illustrative of a boat equipped with devices for handling fishing lines to which my floats are attached.

FIG. 7 is a diagrammatic view showing one of my floats connected with lines shown in FIG. 6.

Like reference numerals refer to like parts throughout the several views.

DESCRIPTION OF THE PREFERRED EMBODIMENT

In trolling for large fish it is common practice to use at least two outrigger poles 10, FIGS. 6 and 7, extending outwardly and upwardly from opposite sides of a boat 11 and with each pole supporting a plurality of downwardly hanging tag lines 12. An eyelet type line guiding member 13, known as a fairlead, is attached to the lower end of each tag line 12 and a main fishing line 14, which usually is formed of twisted steel wire and is about one-sixteenth of an inch in diameter, extends from a winch type device 15 on the boat 11 outwardly and through a fairlead 13 on one of the tag lines 12 and thence rearwardly in the water. A fairly heavy sinker 16 is secured to the trailing end of the main fishing line 14 and several terminal lines 17, each equipped with hook and lure means, are secured to the main line 14 in spaced apart relation so they troll, one above another, at different depths in the water.

This float comprises a buoyant float body 18 preferably about 3 inches thick, 12 or more inches wide and about twice as long as it is wide. It can be formed of a good grade of plastic foam, which has substantial strength and good buoyancy. One product satisfactory for this use is readily available on the market under the trade name "POLYSTYRENE". Preferably two flat pieces of thin but strong waterproof plywood 19 and 19' are attached to the two opposite edges of the float by rods 20. The rods 20 extend entirely through the body 18 and reinforce and strengthen the same. Preferably the line attachment means is assembled on one of the edge strips, in this instance the strip 19, before the two strips 19 and 19' are secured to the float body 18.

The edge of the float body to which the strip 19 is secured is herein termed the bottom page because when the float is in the water and attached to a line the downward pull of the line and the weight of the line attachment devices will normally cause said float to assume a generally vertical plane with this edge lowermost. At the time the float body is being attached to and detached from the line it is usually out of the water and has to be held by the user. At this time it is of advantage to have line clamping means on the float which can be operated with one hand while the other hand holds the float.

The line attaching means comprises a substantially straight rod 22 extending lengthwise along the bottom edge of the float body 18 throughout a major portion of the length of said body and supported for oscillating movement in aligned bearing members 23 which are rigid with the plywood strip 19. Preferably two of said bearing members 23 are positioned in relatively spaced apart relation about mid way of the length of the float body 18 and at least one other bearing member is positioned near each end of the rod 22. Each end of the rod 24 is bent to form a transversely extending line engaging part 24. Each line engaging part 24 has a terminal part 25 which extends generally perpendicularly from it and is positioned so it lies in a recess 26 in the edge strip 19 when the rod 22 is in line engaging position. Parts 24, 25 releasably hold the line 14 and can exert some clamping pressure on it. The bearing holes 23' for rod 22, in each of the two medially positioned bearings 23, see FIG. 3, are elongated lengthwise of the bearing to allow for some movement or spring action of the medial part of said rod 22 toward and away from strip 19, for reasons hereinafter explained. The holes in the two end bearings 23 are not thus elongated.

Line holding parts 24, 25 at the two ends of rod 22 are similar and when they are in a closed or line holding position relative to the plywood strip 19 they determine the transverse positions of connection of the line with the respective end portions of the float and this, in turn, has an effect on the course the float will follow when it is drawn through the water. If the bearing members 23 on a float are positioned so the rod 22 is inclined in the direction shown in FIG. 1 relative to the medial plane of the float then when the float in inverted and used on the starboard or right side of a boat it will be caused to veer away from the boat when drawn through the water. If the rod 22 is slightly inclined in an opposite direction from that shown in FIG. 1 then when the float is inverted and used on the port or left side of a boat it will be caused to veer away from the boat when drawn through the water. These floats are usually used only on the outermost or the two outermost lines at each side of a boat and if the floats are caused to veer away from the boat, as just hereinbefore explained, it helps minimize tangling of lines. If the bearings 23 are positioned so the axis of the rod 22 is parallel to the medial plane of the float then the float will not tend to veer in either direction relative to the course of the boat. An angularly movable line clamping member 28 in the form of a metal plate has one end rigidly attached to the rod 22 between the two medial bearing members 23 and serves as a lever to rotatively move rod 22 and to hold said rod in a line engaging position. A generally L-shaped handle composed of a longer hand hold part 29 and a shorter pivot part 30 has said pivot part 30 rotatively supported in the line clamping member 28. The float can be conveniently carried by grasping the hand hold part 29. The pivot part 30 has a latch plate 31 welded or otherwise rigidly secured to it and disposed at a right angle to it. This latch plate 31 bears frictionally against the outer side of the line clamping member 28 with enough force to prevent undesirable movement of the handle. A washer 32 is provided on part 30 outwardly from latch plate 31 and the end of part 30 is upset as indicated by 30' FIG. 3, to complete this assembly and frictionally secure the handle 29, 30 to the member 28 so it will normally remain in any position in which it is set but can readily be turned manually. The latch plate 31 has in it a notch 33. A notch 34 of similar shape and size is provided in the end of the line clamping member 28 to register with notch 33 for clearance purposes.

A transversely extending metal plate 35 is rigidly secured to the plywood strip 19 and is positioned so it registers with and is in line clamping relation to member 28 when said member 28 is in a line clamping position. Said catch member 36 is tapered so it is similar in shape and is dimensioned so it is at least slightly smaller than the notches 33 and 34. This makes it necessary to have the handle 29, 30 in a predetermined position before latch plate 31 can be either engaged with or disengaged from the hook shaped catch 36. This minimizes the danger of the handle being moved by accident to a disengaged position. Parts 28 and 35 are hereinafter referred to as a first line clamping member and a second line clamping member respectively. The latch plate 31 is rigid on handle part 30 and is positioned so the notch 33 therein is in general alignment with the hand hold part 29. Said catch plate can only be engaged with or disengaged from the catch member 36 when the hand hold part 29 is aligned with the catch member 36. This makes the device more convenient to operate.

To clamp the float to a line 14 the first line clamping member 28 together with the rod 22 and its end parts 24, 25, are angularly moved to an open position, as shown by broken lines in FIG. 3, the line 14 is then placed lengthwise on the plywood strip 19 close to rod 22 and the line clamping and holding parts moved back into a position in which plate 22 and parts 24, 25 lie generally crosswise of strip 19 and notch 33 in latch plate 28 registers with catch member 39. Then by exerting a down pressure and a torque on hand hold 29 with one hand while holding the float with the other hand the user can easily clamp the line securely between plates 28 and 35 and engage latch plate 31 with catch member 36. In clamping the float to a line the parts are preferably set so the hand hold member 29 points in a rearward direction. When thus set, a rounded part of the handle is foremost and objects in the water are not liable to catch on it or accidentally move it to a released position.

The rod 22 is straight and is formed of spring metal and lies close to the mounting strip 19. When plate 28 is pressed against a line 14 that lies on plate 35 close to the adjacent medial bearings 23 the slots 23' in the medial bearings 23, will permit the medial part of rod 22 and the end portion of plate 28 adjacent thereto to lift slightly while the end portions of said rod 22 will not be permitted to lift and the result is that a resilient clamping pressure on the line 14 is provided by rod 22.

I claim:

1. The combination with a flat buoyant float body of generally rectangular cross sectional shape and of greater length than width and having an approximately straight flat clamp carrying edge of substantial width; of line clamping means supported on the clamp carrying edge of said float body, said line clamping means comprising an approximately straight resilient metal rod extending lengthwise along said clamp carrying edge of said float body and supported for rotative movement by said float body; two transversely extending arms rigid with the respective opposite ends of said rod and operable in holding a line and limiting rotative movement of said rod; a first line clamping member positioned perpendicular to said rod and having one end rigidly attached to said rod about mid way between the two ends of said rod; a second line clamping member secured to the clamp carrying edge of said float body in a registering and line clamping position relative to said first line clamping member; a hook shaped catch member carried by said second line clamping member; an L-shaped handle comprising a shorter pivot part perpendicular to and rotatively supported by said first line clamping member and a longer hand hold part spaced from and generally parallel to said first line clamping member, said handle being selectively movable to point the hand hold part thereof toward either end of the float; and a latch member rigid with the shorter pivot part of said handle positioned close to the outer side of said first line clamping member and movable by rotary movement of said handle between an engaged and a disengaged position relative to said hook shaped catch member, said latch member being a flat plate with a notch of only slightly greater width than said hook shaped catch member extending from its periphery inwardly and positioned to pass over the hook shaped catch member when in registration therewith, said plate shaped latch member being operable in maintaining latched engagement with said hook shaped catch member while providing rotary movement of said handle in either direction from the position of registration of the notch therein with said catch member.

2. The apparatus as claimed in claim 1 in which the rod is formed of spring metal and in which bearing members support the respective end portions of said rod and hold the same close to said float body and other bearing members support the rod from the float body approximately mid way of the length of said rod, said other bearing members having in them elongated bearing perforations providing for limited movement of the medial portion of the rod away from the adjacent float body whereby the resistance of said rod to bending provides a resilient clamping pressure on a fishing line clamped by said line clamping members.

* * * * *